(12) United States Patent
Yang et al.

(10) Patent No.: US 11,542,165 B2
(45) Date of Patent: Jan. 3, 2023

(54) METHOD OF MAKING CARBON NANOTUBE BUNDLE

(71) Applicants: Tsinghua University, Beijing (CN); HON HAI PRECISION INDUSTRY CO., LTD., New Taipei (TW)

(72) Inventors: Xin-He Yang, Beijing (CN); Peng Liu, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 287 days.

(21) Appl. No.: 16/908,954

(22) Filed: Jun. 23, 2020

(65) Prior Publication Data
US 2021/0188645 A1   Jun. 24, 2021

(30) Foreign Application Priority Data
Dec. 24, 2019   (CN) .......................... 201911350094.4

(51) Int. Cl.
*C01B 32/176* (2017.01)

(52) U.S. Cl.
CPC ........ *C01B 32/176* (2017.08); *C01B 2202/08* (2013.01)

(58) Field of Classification Search
CPC .......................... C01B 32/166; C01B 32/176
See application file for complete search history.

(56) References Cited

FOREIGN PATENT DOCUMENTS

| CN | 1935631 | 3/2007 |
|---|---|---|
| CN | 105158158 | 12/2015 |

OTHER PUBLICATIONS

Jin, Kangke, et al. "Sulfur/carbon nanotube composite film as a flexible cathode for lithium-sulfur batteries." The Journal of Physical Chemistry C 117.41 (2013): 21112-21119.*
Pint, Cary L. "Capillary Force Guided Nanomanufacturing of Composite Materials for Advanced Battery Applications." ASME International Mechanical Engineering Congress and Exposition. vol. 58356. American Society of Mechanical Engineers, 2017.*

* cited by examiner

*Primary Examiner* — Richard M Rump
(74) *Attorney, Agent, or Firm* — ScienBiziP, P.C.

(57) ABSTRACT

A method of making a carbon nanotube bundle is provided. A plurality of carbon nanotubes is provided. A plurality of sulfur nanoparticles is disposed on the plurality of carbon nanotubes to form at least two visible carbon nanotubes. The at least two visible carbon nanotubes are stacked to form a carbon nanotube bundle preparation body. The plurality of sulfur nanoparticles in the carbon nanotube bundle preparation body is removed to obtain the carbon nanotube bundle.

16 Claims, 1 Drawing Sheet

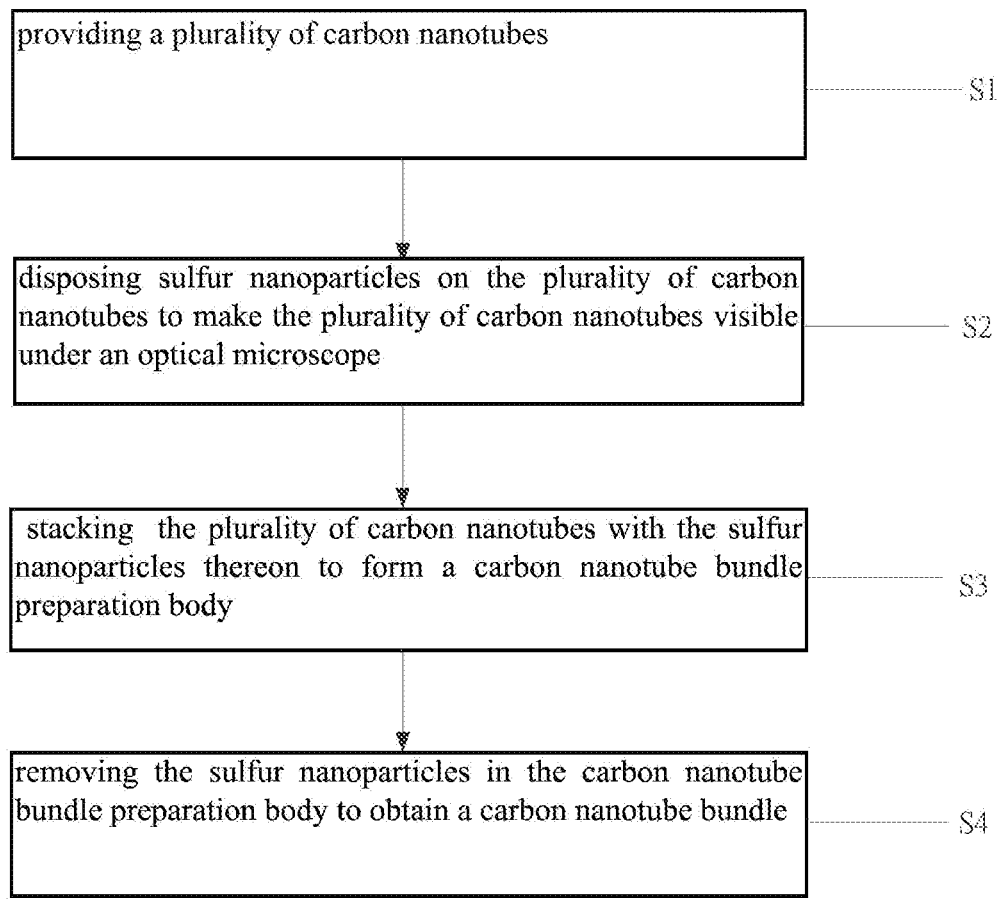

METHOD OF MAKING CARBON NANOTUBE BUNDLE

This application claims all benefits accruing under 35 U.S.C. § 119 from China Patent Application No. 201911350094.4, filed on Dec. 24, 2019, in the China National Intellectual Property Administration, the contents of which are hereby incorporated by reference.

FIELD

The present disclosure relates to a method of making a carbon nanotube bundle.

BACKGROUND

A diameter of a carbon nanotube is only about 1 nanometer, and a length of the carbon nanotube may be about hundreds of nanometers to meters. In the related research process of carbon nanotube, carbon nanotube bundles with different diameters need to be prepared. However, because one single carbon nanotube is very thin, it can only be seen by scanning electron microscope, transmission electron microscope, atomic force microscope, scanning tunnel microscope, etc. Thus, it is not convenient for real-time imaging, and the imaging areas of the above mentioned devices are generally small. Furthermore, the above listed microscopes have strict requirements for detection conditions, it is difficult to spot transfer carbon nanotubes to form a carbon nanotube bundle. Although there are fewer requirements for the detection conditions of optical microscope, one single carbon nanotube is not visible under the optical microscope. A method to prepare a carbon nanotube bundle with a desired diameter under the optical microscope is desirable.

BRIEF DESCRIPTION OF THE DRAWINGS

Implementations of the present technology will now be described, by way of embodiments, with reference to the attached FIGURES.

FIG. 1 is a flowchart of one embodiment of a method of making a carbon nanotube bundle.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one".

It will be appreciated that for simplicity and clarity of illustration, where appropriate, reference numerals have been repeated among the different FIGURES to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

Several definitions that apply throughout this disclosure will now be presented.

The term "comprise" or "comprising" when utilized, means "include or including, but not necessarily limited to"; it specifically indicates open-ended inclusion or membership in the so-described combination, group, series, and the like.

FIG. 1 illustrates a method of one embodiment of making a carbon nanotube bundle, the method comprises S1, providing a plurality of carbon nanotubes, S2. disposing sulfur nanoparticles on the plurality of carbon nanotubes to make the plurality of carbon nanotubes visible under an optical microscope, S3, stacking the plurality of carbon nanotubes with the sulfur nanoparticles thereon to form a carbon nanotube bundle preparation body, and S4. removing the sulfur nanoparticles in the carbon nanotube bundle preparation body to obtain the carbon nanotube bundle.

At block S1, the carbon nanotubes can be prepared by a chemical vapor deposition method and a physical vapor deposition method. In one embodiment, the carbon nanotubes are carbon nanotubes in a super-aligned carbon nanotube array obtained by the chemical vapor deposition method.

The super-aligned carbon nanotube array can be formed by the following substeps: (S11) providing a substantially flat and smooth substrate, (S12) forming a catalyst layer on the substrate, (S13) annealing the substrate with the catalyst layer thereon in air at a temperature ranging from about 700° C. to about 900° C. for about 30 to 90 minutes, (S14) heating the substrate with the catalyst layer thereon to a temperature ranging from about 500° C. to about 740° C. in a furnace with a protective gas therein, and (S15) supplying a carbon source gas to the furnace for about 5 to 30 minutes and growing the super-aligned carbon nanotube array on the substrate.

In step (S11), the substrate can be a P-type silicon wafer, an N-type silicon wafer, or a silicon wafer with a film of silicon dioxide thereon. In one embodiment, a 4-inch silicon wafer is used as the substrate.

In step (S12), the catalyst can be made of iron (Fe), cobalt (Co), nickel (Ni), or any alloy thereof.

In step (S14), the protective gas can be made up of at least one of nitrogen ($N_2$), ammonia ($NH_3$), and a noble gas.

In step (15), the carbon source gas can be a hydrocarbon gas, such as ethylene ($C_2H_4$), methane ($CH_4$), acetylene ($C_2H_2$), ethane ($C_2H_6$), or any combination thereof.

The super-aligned carbon nanotube array formed under the above conditions is essentially free of impurities such as carbonaceous or residual catalyst particles. The carbon nanotubes in the super-aligned carbon nanotube array are closely packed together by van der Waals attractive force.

At block S2, a method for disposing the sulfur nanoparticles on the at least two carbon nanotubes comprises S21, heating sulfur powder to melt the sulfur powder to form a sulfur liquid;

S22, suspending the at least two carbon nanotubes above the sulfur liquid, and attaching a sulfur vapor to the at least two carbon nanotubes to form the sulfur nanoparticles on the at least two carbon nanotubes.

In step S21, the sulfur powder is disposed on a hot plate, and the sulfur powder is heated to a melting point to form the sulfur liquid. The sulfur powder is heated to a temperature in a range from about 130° C. to about 160° C. to form the sulfur liquid. In one embodiment, the sulfur powder is heated to 150° C. by the hot plate to form the sulfur liquid.

In step S22, the at least two carbon nanotubes may be suspended between two supports and a part of the at least two carbon nanotubes is suspended. The suspended at least two carbon nanotubes are disposed above the sulfur liquid for a predetermined period of time to allow the sulfur vapor to adhere to the at least two carbon nanotubes to form the plurality of sulfur nanoparticles on the at least two carbon nanotubes. At this time, the sulfur nanoparticles are attached to a surface of a suspended portion of the at least two carbon nanotubes. Because the sulfur nanoparticles have a strong scattering of light, the at least two carbon nanotubes to which the plurality of sulfur nanoparticles are attached can be seen under a common optical microscope. In one embodiment, the at least two carbon nanotubes are disposed on at least two substrates, and the at least two carbon nanotubes are partially suspended. The suspended at least two carbon nanotubes are disposed above the sulfur liquid for 30 seconds so that the sulfur vapor adheres to the at least two carbon nanotubes to form the =sulfur nanoparticles, and the sulfur nanoparticles are formed on an outside surface of the suspended portion of the at least two carbon nanotubes.

At block S3, under an optical microscope, the at least two carbon nanotubes with the sulfur nanoparticles thereon are stacked to form a carbon nanotube bundle preparation body. Since the at least two carbon nanotubes with the sulfur nanoparticles thereon can be seen under the optical microscope, the at least two carbon nanotubes with the sulfur nanoparticles thereon can be transferred and stacked together. Specifically, two ends of the carbon nanotube with the sulfur nanoparticles thereon can be cut off by using two tungsten needle tips, the two ends of the carbon nanotubes with the sulfur nanoparticles thereon are adhered to the two tungsten needle tips. Thus, the carbon nanotubes with the sulfur nanoparticles thereon can be transferred by the two tungsten needle tips, and the carbon nanotubes with the sulfur nanoparticles thereon can be stacked on together. In one embodiment, under the optical microscope, the two tungsten needle tips are placed on two ends of the suspend portion of the carbon nanotube with the sulfur nanoparticles thereon, and the two tungsten needle tips are in contact with the carbon nanotubes with the sulfur nanoparticles thereon, then the two tungsten needle tips are moved to cut off the two ends of the suspend portion of the carbon nanotube with the sulfur nanoparticles thereon. Thus, the carbon nanotube with the sulfur nanoparticles thereon is transferred on the two tungsten needle tips. Then, the carbon nanotube with the sulfur nanoparticles thereon on the two tungsten needle tips is attached to another one of the carbon nanotubes with the sulfur nanoparticles thereon to form the carbon nanotube bundle preparation body.

When the two tungsten needle tips are in contact with the carbon nanotube with the sulfur nanoparticles thereon, the carbon nanotube with the sulfur nanoparticles thereon will adhere to the two tungsten needle tips by Van der Waals force. Therefore, the suspended portion of the carbon nanotube with the sulfur nanoparticles thereon will adhere to the two tungsten needle tips after cutting off. Thus, it is easy to move the carbon nanotubes with the sulfur nanoparticles thereon. According to a required diameter of a carbon nanotube bundle, an appropriate number of the carbon nanotubes with the sulfur nanoparticles thereon may be selected and stacked together to form the carbon nanotube bundle preparation body.

At block S4, the carbon nanotube bundle preparation body may be placed and standing in a nitrogen cabinet to remove the sulfur nanoparticles to obtain the carbon nanotube bundle; or the carbon nanotube bundle preparation body may be heated to sublimate and remove the sulfur nanoparticles to obtain the carbon nanotube bundle. In one embodiment, the carbon nanotube bundle preparation body is heated to 150° C. After the sulfur nanoparticles of the carbon nanotube bundle preparation body are removed, the carbon nanotubes are attracted to each other to form the carbon nanotube bundle by Van der Waals force. In one embodiment, the carbon nanotube bundle preparation body is placed on a heating plate, and the carbon nanotube bundle preparation body is heated for 10 minutes to remove the sulfur nanoparticles to obtain the carbon nanotube bundle.

The method of making a carbon nanotube bundle has the following beneficial characteristics. Firstly, under the optical microscope, the carbon nanotubes with the sulfur nanoparticles thereon can be formed by disposing the sulfur nanoparticles on the carbon nanotubes, so that the carbon nanotubes with the sulfur nanoparticles thereon can be further transferred and stacked on other one of the carbon nanotubes with the sulfur nanoparticles thereon together. The method of making a carbon nanotube bundle can form a carbon nanotube bundle with a required diameter, and the method of making a carbon nanotube bundle is simple and easy to operate. Secondly, the preparation process of the carbon nanotube bundle is convenient and efficient, and the cost is low. The carbon nanotube bundle can be quickly prepared. The entire preparation process is simple and does not require a precise microscope and complicated operations.

Even though numerous characteristics and advantages of certain inventive embodiments have been set out in the foregoing description, together with details of the structures and functions of the embodiments, the disclosure is illustrative only. Changes may be made in detail, especially in matters of arrangement of parts, within the principles of the present disclosure to the full extent indicated by the broad general meaning of the terms in which the appended claims are expressed.

Depending on the embodiment, certain of the steps of methods described may be removed, others may be added, and the sequence of steps may be altered. It is also to be understood that the description and the claims drawn to a method may comprise some indication in reference to certain steps. However, the indication used is only to be viewed for identification purposes and not as a suggestion as to an order for the steps.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:
1. A method of making a carbon nanotube bundle, the method comprises:
providing a plurality of carbon nanotubes;
disposing sulfur nanoparticles on the plurality of carbon nanotubes;

stacking the plurality of carbon nanotubes with the sulfur nanoparticles thereon to form a carbon nanotube bundle preparation body; and removing the sulfur nanoparticles in the carbon nanotube bundle preparation body to obtain a carbon nanotube bundle.

2. The method of claim 1, wherein a method of disposing the sulfur nanoparticles on the plurality of carbon nanotubes comprises:

heating sulfur powder to melt the sulfur powder to form a sulfur liquid;

suspending the plurality of carbon nanotubes above the sulfur liquid, and depositing a sulfur vapor on the plurality of carbon nanotubes to form the sulfur nanoparticles.

3. The method of claim 2, wherein the sulfur powder is heated to a temperature ranged from approximately 130° C. to approximately 160° C.

4. The method of claim 2, wherein the plurality of carbon nanotubes are suspended between two supports and portions of the plurality of carbon nanotubes are suspended.

5. The method of claim 4, wherein two ends of at least one of the carbon nanotubes with the sulfur nanoparticles thereon are cut off by two tungsten needle tips, and the at least one carbon nanotube with the sulfur nanoparticles thereon is adhered to the two tungsten needle tips after the cutting.

6. The method of claim 5, wherein the two tungsten needle tips are in contact with two ends of the portions which are suspended of the at least one carbon nanotube with the sulfur nanoparticles thereon, then the two tungsten needle tips are moved to cut off the two ends of the portions which are suspended of the at least one carbon nanotube with the sulfur nanoparticles thereon.

7. The method of claim 1, wherein the carbon nanotube bundle preparation body is placed in a nitrogen cabinet to remove the sulfur nanoparticles to obtain the carbon nanotube bundle.

8. The method of claim 1, wherein the carbon nanotube bundle preparation body is heated to sublimate and remove the sulfur nanoparticles to obtain the carbon nanotube bundle.

9. A method of making a carbon nanotube bundle, the method comprises:

providing a plurality of carbon nanotubes;

suspending the plurality of carbon nanotubes by two supports, and disposing a sulfur nanoparticles on the plurality of carbon nanotubes;

stacking the plurality of carbon nanotubes with the sulfur nanoparticles thereon to form a carbon nanotube bundle preparation body; and removing the sulfur nanoparticles in the carbon nanotube bundle preparation body to obtain a carbon nanotube bundle.

10. The method of claim 9, wherein a method for disposing the sulfur nanoparticles on the plurality of carbon nanotubes comprises:

heating sulfur powder to melt the sulfur powder to form a sulfur liquid;

suspending the plurality of carbon nanotubes above the sulfur liquid, and depositing a sulfur vapor on the plurality of carbon nanotubes to form the sulfur nanoparticles.

11. The method of claim 10, wherein the sulfur powder is heated to a temperature ranged from approximately 130° C. to approximately 160° C.

12. The method of claim 10, wherein portions of the plurality of carbon nanotubes are suspended between the two supports.

13. The method of claim 9, wherein two ends of at least one of the carbon nanotubes with the sulfur nanoparticles thereon are cut off by two tungsten needle tips, and the at least one carbon nanotube with the sulfur nanoparticles thereon is adhered to the two tungsten needle tips.

14. The method of claim 13, wherein the two tungsten needle tips are in contact with two ends of the portions which are suspended of the at least one carbon nanotube with the sulfur nanoparticles thereon, then the two tungsten needle tips are moved to cut off the two ends of the portions which are suspended of the at least one carbon nanotube with the sulfur nanoparticles thereon.

15. The method of claim 9, wherein the carbon nanotube bundle preparation body is placed in a nitrogen cabinet to remove the sulfur nanoparticles to obtain the carbon nanotube bundle.

16. The method of claim 9, wherein the carbon nanotube bundle preparation body is heated to sublimate and remove the sulfur nanoparticles to obtain the carbon nanotube bundle.

* * * * *